(12) United States Patent
Hilleary

(10) Patent No.: US 10,556,606 B2
(45) Date of Patent: Feb. 11, 2020

(54) RAILROAD CAR LOCATION, SPEED, AND HEADING DETECTION SYSTEM AND METHODS WITH SELF-POWERED WIRELESS SENSOR NODES

(71) Applicant: THE ISLAND RADAR COMPANY, Olathe, KS (US)

(72) Inventor: Thomas N. Hilleary, Lenexa, KS (US)

(73) Assignee: THE ISLAND RADAR COMPANY, Olathe, KS (US)

(*) Notice: Subject to any disclaimer, the term of this patent is extended or adjusted under 35 U.S.C. 154(b) by 292 days.

(21) Appl. No.: 15/581,058

(22) Filed: Apr. 28, 2017

(65) Prior Publication Data

US 2017/0313331 A1 Nov. 2, 2017

Related U.S. Application Data

(60) Provisional application No. 62/329,366, filed on Apr. 29, 2016.

(51) Int. Cl.
*B61L 25/02* (2006.01)
*B61L 17/02* (2006.01)

(52) U.S. Cl.
CPC ............ *B61L 25/021* (2013.01); *B61L 17/02* (2013.01); *B61L 25/023* (2013.01); *B61L 25/025* (2013.01)

(58) Field of Classification Search
CPC .................................................. B61L 25/021
See application file for complete search history.

(56) References Cited

U.S. PATENT DOCUMENTS

| | | | | |
|---|---|---|---|---|
| 4,179,744 A * | 12/1979 | Lowe | ........................ | B61L 1/08 246/122 R |
| 5,786,998 A * | 7/1998 | Neeson | .................. | B61L 25/021 340/3.1 |
| 6,323,785 B1 * | 11/2001 | Nickell | .................... | B61L 23/06 246/292 |
| 7,575,201 B2 * | 8/2009 | Bartonek | .................. | B61K 9/08 246/121 |
| 8,677,920 B1 * | 3/2014 | Jeng | ........................ | B63B 3/08 114/312 |
| 9,623,885 B1 * | 4/2017 | Shubs, Jr. | ............ | B61L 27/0011 |
| 2006/0025897 A1 * | 2/2006 | Shostak | ................ | B60C 23/005 701/1 |
| 2008/0169385 A1 * | 7/2008 | Ashraf | ..................... | B61L 29/22 246/130 |
| 2011/0118913 A1 * | 5/2011 | Pretorius | ............. | B61L 27/0088 701/19 |
| 2011/0282540 A1 * | 11/2011 | Armitage | .................. | H04Q 9/00 701/31.4 |
| 2013/0211737 A1 * | 8/2013 | Batcheller | ................ | G01M 7/00 702/34 |

(Continued)

*Primary Examiner* — Manuel A Rivera Vargas
*Assistant Examiner* — Yaritza H Perez Bermudez
(74) *Attorney, Agent, or Firm* — Armstrong Teasdale LLP

(57) ABSTRACT

A railroad car location, speed and heading sensor system including at least one self-powered, tie-mounted sensor node that is applicable universally to different railroad settings without using track circuits, inductive loops, radar systems, and wheel counters and associated disadvantages. Reliable and relatively low cost deterministic and redundant car presence detection is realized when multiple sensor nodes are arranged in a network, which may be a wireless mesh network, that is not affected by environmental conditions.

15 Claims, 6 Drawing Sheets

(56) References Cited

U.S. PATENT DOCUMENTS

2014/0365702 A1* 12/2014 Ray .................... G06F 13/4068
  710/305
2016/0046308 A1* 2/2016 Chung ................. B61L 25/025
  701/20

* cited by examiner

RAILROAD CAR LOCATION, SPEED, AND HEADING DETECTION SYSTEM AND METHODS WITH SELF-POWERED WIRELESS SENSOR NODES

CROSS REFERENCE TO RELATED APPLICATIONS

This application claims the benefit of U.S. Provisional Application Ser. No. 62/329,366 filed Apr. 29, 2016, the complete disclosure of which is hereby incorporated by reference in its entirety.

BACKGROUND OF THE INVENTION

The field of the invention relates generally to sensor systems and methodology for detecting position and movement of an object along a path of travel, and more specifically to wireless sensor systems and methods for detecting railroad car location, speed, and heading information in a section of railroad tracks including opposed rails supported by a series of railroad ties.

Railroad transportation systems are in widespread use to safely transport goods and persons across vast distances in trains operable with much greater efficiency than other forms of travel. Trains typically include a connected string of a variety of different types of railroad cars and one or more locomotives or engines that pull or propel the railroad cars along railroad tracks. Railroad cars may be designed and are available for many purposes but generally may be categorized as either freight cars or passenger cars. Freight cars may include, for example only boxcars, flatcars, hopper cars and tank cars, and auto carriers. Passenger cars include coach cars, carriage cars, dining cars, lounge cars and sleeping cars. Various different types of such railroad cars (collectively referred to herein as "cars" for the purposes of the present disclosure) may be included in any given train.

For a variety of reasons, sensing and detecting a presence of a portion of a train, a railroad car or cars that are disconnected from an engine, or an engine in desired sections of railroad tracks is desired. Known railroad detection systems and methods, however, are disadvantaged in some aspects, and improvements are desired.

BRIEF DESCRIPTION OF THE INVENTION

Advantageous embodiments of sensor systems and methods are disclosed that facilitate train detection, speed detection and heading detection and information along selected sections of railroad tracks in a reliable yet low cost and flexible manner. The sensor systems may detect a presence, speed and heading information for a train, one or more cars that are decupled from an engine, or an engine in a selected section of track being monitored by the system.

The system may include at least one processor-based sensor node that is configured to detect a presence of the train, one or more cars that are decupled from an engine, or an engine using a number of different types of detection. Preferably, the system may include a plurality of tie-mounted or rail mounted sealed "hockey-puck" sized sensor modules or sensor nodes attachable to, for example, every n number of railroad tie to define the section of tracks for the purposes of defining and monitoring one or more protected areas or zones to facilitate safe, effective and productive railcar switching operations, pull-out track operations for switched cars, rail crossing operations for multiple sets of intersecting or switched tracks, and rail crossing warning system operation for intersections of railroad tracks and roadways for automotive vehicle use.

The plurality of sensor nodes may wirelessly connect to and communicate with one another in a mesh network and communicate presence information to one or more concentrator devices using low power digital radio communication techniques and protocols. The concentrator device(s) may in turn, communicate with a master processor and railroad systems to ensure safe, effective and productive use of railroad resources. The system, by virtue of modular sensor nodes and concentrator nodes, may easily be scaled to define protection zones of any desired length without using conventional track circuits and as a result the sensor system is generally weather impervious.

Each sensor node may include one or more of a plurality of different types of on-board power supplies for long-life, maintenance free operation of the system. The different types of power supplies for each sensor node may involve, but are not necessarily limited to, one or more of a battery power supply, a vibration energy harvesting system, a stress energy harvesting system, a pressure energy harvesting system, a wireless energy transmission harvesting system, a solar energy harvesting system and a capacitive energy storage system. When provided in combination, the plurality of different types of on-board power supplies may be controlled by power management circuitry in a prioritized power management scheme to limit the use of battery power and conserve battery power as long as possible to defer maintenance or performance issues attributable to the battery. Power saving communication protocols and techniques, including but not necessarily limited to time division multiple access (TDMA) communication synchronized for ultra-low duty cycle and/or a Time Synchronized Mesh Protocol (TSMP), are further utilized to extend battery life and generally maintenance free operation of the system.

Multiple and different types of sensing and detecting components, systems and subsystems may be provided in each sensor node to sense and detect a train, engine, or de-coupled car in the monitored zone. The combination of different types of detection realizes a deterministic and redundant system in which error-free detection is possible. Confirmation of detection events by comparing signals or outputs from the various types of sensing elements further facilitates a closed loop feedback control of railroad switching equipment and other systems as desired. The different types of detection in each sensor node may involve, but are not necessarily limited to, one or more of an inductive sensor, a magnetometer, a vibration sensor, an acoustic sensor, a pressure sensor, a wireless energy harvesting system, a microwave impulse radar sensor, an ultrasonic sensor, and an ambient light sensor. In a particular embodiment, nano-power vibration sensing is utilized to signal that a likely detection event is imminent, and to cause the sensor node to wake up from a low power sleep state and initiate a low power ultra-wideband, micro power impulse radar function in each sensor node with range gating to sense the presence of an overhead structure (i.e., a portion of a train, a car decoupled from an engine, or an engine) located between about 24 inches and about 36 inches above the sensor.

One or more centralized Wi-Fi access points (concentrators) may be provided in the middle of the section of the track being monitored. The one or more concentrators may provide RF energy via wireless power transfer (WPT) to power the ultra-low power function of a group of sensor nodes. The RF energy may utilize ambient backscattering to communicate with adjacent sensor nodes in a peer-to-peer mesh network configuration and/or communicate with the access point(s) to collect detection information from contiguous sensor nodes at this point to develop information related to train detection.

The system may beneficially utilize an activation of contiguous nodes to derive train (or train car) speed and heading information, and wirelessly communicate the same to an external system. Health state information may likewise be generated and communicated by the sensor nodes for proactive use and management of the system.

BRIEF DESCRIPTION OF THE DRAWINGS

Non-limiting and non-exhaustive embodiments are described with reference to the following Figures, wherein like reference numerals refer to like parts throughout the various views unless otherwise specified.

DETAILED DESCRIPTION OF THE INVENTION

Figure 1:
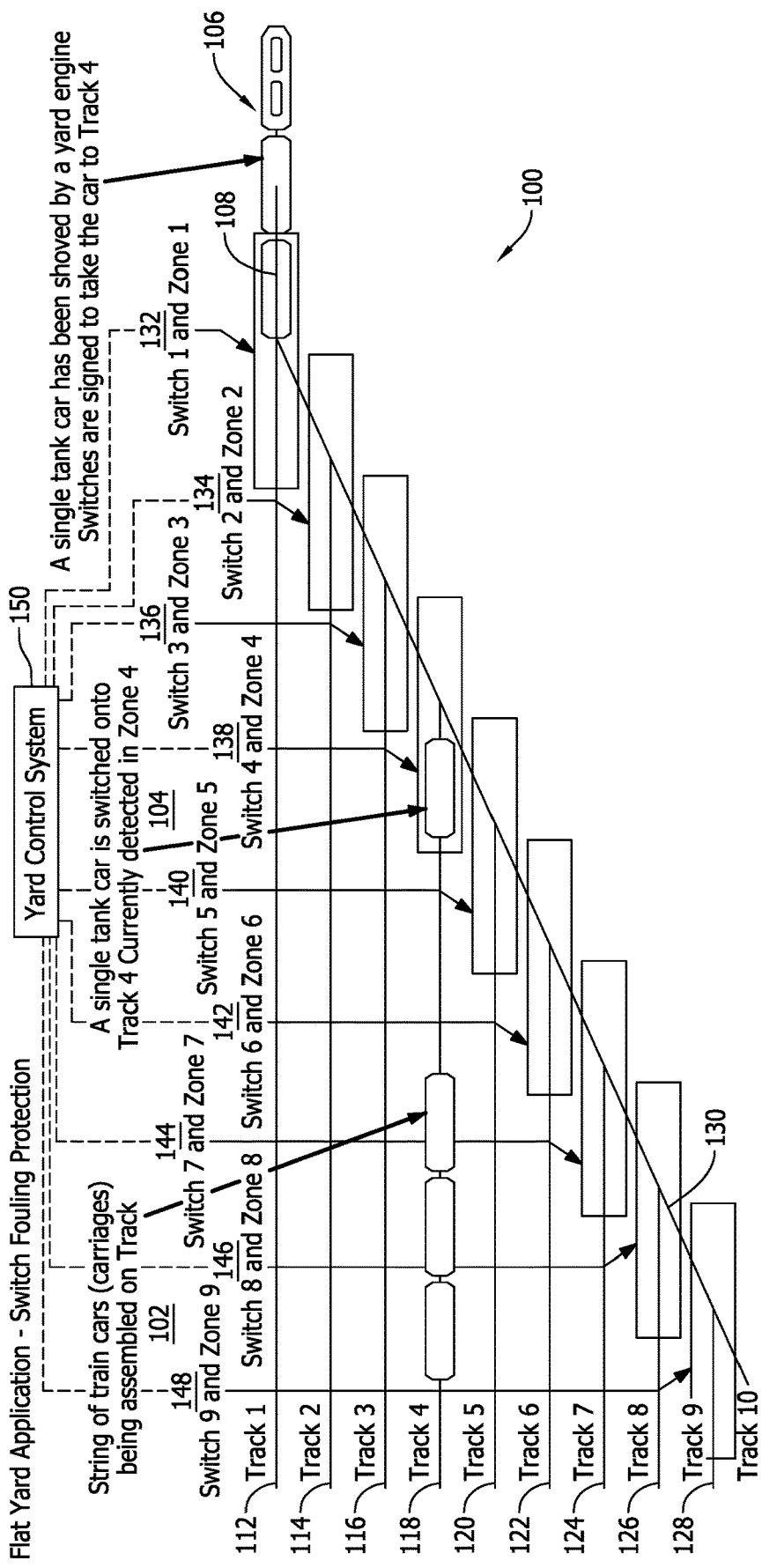
FIG. 1 illustrates an exemplary railroad switchyard including an arrangement of railroad tracks and switches that may benefit from the sensor system and methodology of the present invention.

Sensing systems and methods for detecting a presence of a train, or a portion of a train (e.g., an engine or car that is not coupled and part of a train) is desirable in a number of different situations and settings for railroad operators and entities. In some instances, railroads cars are moved along sections of track while being decoupled from an engine. As such, detecting a railroad car location (i.e. physical presence), speed (i.e., velocity) and heading (i.e., direction of travel) is beneficial for safe, effective and productive railroad operations in a switchyard. Detection of engine location, speed and heading information is likewise beneficial in certain segments or sections of railroad tracks while the engine is in use, but not coupled to a complete set of cars. In still other instances, detection of the train (i.e., the engine and its complete set of coupled cars) is desirably detected along other segments or sections of railroad tracks.

Detection systems and methods exist that may capably sense or detect a train advancing toward an intersection of a railroad track (or tracks) and a roadway for automotive vehicle use. Such detection systems communicate with crossing warning systems to provide visual and/or audible warnings to vehicle drivers using a roadway that crosses the track of the inbound train. In some instances, the crossing warning systems and methods also involve barrier gates and the like that may be operated to obstruct the roadway to prevent vehicles from crossing the railroad tracks until the train safely clears the crossing. Such crossing warning systems are effective to prevent collisions between trains and automotive vehicles, but tend to involve built-in detection infrastructure at the crossing site, and as a result tend to be both expensive to install and maintain. Lower cost and more reliable detection systems are desired.

In railroad switch yards where railroad cars are sorted and coupled to one another in a selected order for transport to a desired destination, moving railroad cars that are de-coupled from an engine presents a different need for detecting railroad car location, speed and heading information, namely to prevent railroad cars from clipping or partly colliding with one another in the yard, or ensure synchronized operation of track switching equipment with actual movement of the car. Systems and methods exist for these purposes as well, but are also deficient in some aspects.

At crossings or intersections of multiple train tracks with one another, detecting engine and/or railroad car location, speed and heading information is likewise beneficial to ensure that one train does not impinge upon another at a crossing in an unsafe manner. Providing a low cost and reliable sensor system for such purposes would be highly desired.

In order to understand the invention to its fullest extent, a discussion of the state of the art follows with some discussion of problems, deficiencies and disadvantages presented by existing or conventional sensor systems and methods in railroad applications, followed by a discussion of exemplary embodiments of the present invention that beneficially overcome such problems and disadvantages and meet longstanding and unfilled needs in the art. Method aspects will be in part apparent and in part specifically discussed in the following description. Also, while described in the context of railroad applications, it should be understood that the systems and methods described herein are applicable to non-railroad applications. That is, the benefits and advantages of the present invention extend generally to detection of sensor systems and methodology for detecting position and movement of objects other than trains or portions of a train along a path of travel. The exemplary context of railroad applications is accordingly presented for the sake of illustration rather than limitation.

I. State of the Railroad Detection Art

Strings of railroad cars, sometimes referred to as "consists", are assembled and disassembled, combined and sorted at railroad facilities called switching yards. Switching yards include a number of railroad tracks in close proximity to one another and a number of switches for selectively directing railroad cars from one set of railroad tracks to an adjoining set of railroad tracks. As the consists are arranged or re-arranged on close proximity railroad tracks in a switchyard, detection systems and methods are known that attempt to prevent switch fouling or clipping of cars on the close proximity railroad tracks. The basic function and operation of two types of railroad yards, namely Flat Yards and Classification Yards, are described below to illustrate the need and usefulness of the present invention. It shall be understood as well that the present invention also has applicability to a common feature of all railroad switching yards, namely a Pull-Out Track as also described below.

FIG. 1 illustrates an exemplary flat yard 100 in which consists of railroad cars, sometimes referred to as train cars, may be sorted and assembled in a desired order for a particular train. More specifically, FIG. 1 illustrates a process of assembling a consist 102 to define a particular train with a series of individual cars 104 coupled in a predetermined order and a locomotive 106, sometimes referred to as an engine. The cars 104 may be any of the types of railroad cars mentioned above or known in the art, and the engine 106 may be one of a variety of different types of engines (e.g., steam, gas diesel, electric, etc.) known in the art to provide sufficient motive power to move the desired number of cars along a railroad track.

Flat yards are somewhat level facilities where a single railroad track 108, shown in FIG. 1 and referred to herein as an "entrance track", can be connected to any number of an array of additional railroad tracks, sometimes referred to as classification tracks, through a connector track 110 and a series of conventional railroad switches. As seen in FIG. 1, ten additional railroad classification tracks are shown in combination with the entrance track 108 and the connector track 110. The classification tracks shown in FIG. 1 are designated as 112, 114, 116, 118, 120, 122, 124, 126, 128 and 130 (also respectively designated as Track 1 through Track 10 in FIG. 1) that interconnect to the entrance track 108 via nine railroad switches and associated switch zones 132, 134, 136, 138, 140, 142, 144, 146 and 148 (respectively designated as Switch 1, Zone 1 through Switch 9, Zone 9) and sections of the connector track 110.

Conventionally, the classification tracks 112, 114, 116, 118, 120, 122, 124, 126, 128 and 130 are relatively close to one another in the yard 100, such as about 3 m (9.8 ft) apart from one another. While ten classification tracks and nine switches and switch zones are illustrated in the example yard 100 shown in FIG. 1, it is understood that greater or fewer numbers of classification tracks and switches may be provided in other embodiments. The arrangement of classification tracks and switches shown in FIG. 1 is sometimes referred to as a "ladder" by those in the field. Other arrangements of entrance tracks, classification tracks, and switches are possible, however. The geometry of the yard 100 shown in FIG. 1 is provided for the sake of illustration rather than limitation.

Each switch 132, 134, 136, 138, 140, 142, 144, 146 and 148 is operable in known manner between a first position and a second position to connect the pair of rails upstream of the switch to a selected one of a different pair of rails downstream from the switch. The switches 132, 134, 136, 138, 140, 142, 144, 146 and 148 are individually and independently operable to selectively direct a railroad car 104 traveling on the entrance track 108 to one of the tracks 112, 114, 116, 118, 120, 122, 124, 126, 128 and 130 in the array by and through any necessary sections of the connector track 110.

For example, and referring to the example of FIG. 1, the first switch 132 in the first position would direct a car 104 traveling on the entrance track 108 to the first track 112 while bypassing the connector track 110. In the second position the first switch 132 would direct a car moving from the entrance track 108 to the connecting track 110 and therefore bypass the first track 112. Likewise, the second switch 134 in the first position would direct a car 104 traveling on the connecting track 110 past the first switch 132 to the second track 114, while in the second position the second switch 134 would direct the car 104 to bypass the second track 114 and continue on the connecting track 110 toward the third switch 136. In the example of FIG. 1 the first, second, and third switches 132, 134, 136 have been activated to keep the car 104 moving along the connector track 110 (and past the tracks 112, 114, 116) while the fourth switch 138 has been activated to divert the car 104 onto the fourth track 118 where the consist 102 is being assembled.

It should be evident that the remaining switches 140, 142, 144, 146 and 148 can be activated to direct a car 104 past the respective tracks 120, 122, 124, 126, 128 and continue on the connector track 110 or instead direct the car 104 onto one of the tracks 120, 122, 124, 126, 128. The process of directing cars 104 through the array of tracks to a desired track is sometimes referred to as "switching" the cars 104, and a car 104 that has been directed to the proper one of the classification tracks 112, 114, 116, 118, 120, 122, 124, 126, 128 and 130 via appropriate operation of the switches 132, 134, 136, 138, 140, 142, 144, 146 and 148 is sometimes referred to as a "switched" car.

By aligning each of the switches 132, 134, 136, 138, 140, 142, 144, 146 and 148 to either of the two positions to connect the desired set of tracks, a car 104 that is moving from the single entrance track 108 can be routed to any of the track lengths 112, 114, 116, 118, 120, 122, 124, 126, 128 and 130 in the ladder. Typically, a switching engine 106 will push a single car 104 or a short string of cars 104 (e.g., two to five cars 104) down the single entrance track 108 and a yard worker will uncouple the car(s) 104 from the engine 106 at a point where it is estimated to have sufficient velocity to reach the desired classification track to start a consist, or to reach the desired classification track where a partial consist 102 exists (i.e., an accumulation of previously switched cars 104 such as in the consist 102 shown in FIG. 1). When the switched car(s) 104 reaches the partial consist 102 the coupling mechanism on the switched car 104 engages the coupling mechanism of the leading end of the last car 104 in the accumulation of the partial consist 102, physically adding the car 104 (or cars 104) to the growing consist 102. Further cars may be switched and added to the consist 102 in a similar manner. As such, the number of cars 104 in the consist 102 can successively grow until a desired number of cars 104 in a desired order are assembled on the respective classification track.

As seen in FIG. 1, the partial consist 102 is shown to include three previously switched cars, with the presently switched car 104 about to become the fourth car in the consist 102 on the fourth classification track 118. A consist of cars 104 may similarly be formed on any other one of the nine classification tracks 112, 114, 116, 120, 122, 124, 126, 128 and 130 in the ladder each having a desired selection and order of cars 104, with each car or group of cars being directed to the desired track in the ladder. Multiple consists may be assembled on the various classification tracks 112, 114, 116, 118, 120, 122, 124, 126, 128 and 130 with switched cars 104, with the consists formed eventually being linked to define a train having a larger number of cars than any individual consist formed on the ladder.

Once each car 104 being switched has navigated its way through the array of switches 132, 134, 136, 138, 140, 142, 144, 146 and 148 and classification tracks 112, 114, 116, 118, 120, 122, 124, 126, 128 and 130 to the desired consist on the proper classification track, the switch alignments may then be altered in preparation for the next car (or cars) introduced by the engine 106 for switching to the same consist or another consist on a selected one of the tracks. That is, successively switch cars 104 may be directed to the same consist as the previous car or to another consist as the previously switched car 104. Since the classification tracks 112, 114, 116, 118, 120, 122, 124, 126, 128 and 130 are different in length, larger consists may be formed on some of the classification tracks 112, 114, 116, 118, 120, 122, 124, 126, 128 and 130 than on others. At the end of this sorting process via switching of the cars 104 to assemble consists 102, an engine 106 may then pull the consists 102 out of the yard in which they have been built, with the consists linked as desired to complete a larger train. Once completed, the train may leave the yard 100 with all its desired cars 104 for travel to a distant destination. At the distant destination, another disassembly/reassembly process of car sorting may be repeated until each car 104 is eventually delivered to its final destination.

For maximum productivity it is important that the time between each car 104 moving down and switched through the ladder of the flat yard 100 be minimized. That is, in order to maximize the number of cars 104 switched per hour, shift, or day the time between successive car switching should be as small as possible. Accordingly, the ordering of switched cars 104—the order in which they are sorted and to which classification track 112, 114, 116, 118, 120, 122, 124, 126, 128 or 130 in the ladder they are routed—is generally an automated process where a computerized system, database, and control system (referred to herein as a yard control system 150) aligns the array of yard switches 132, 134, 136, 138, 140, 142, 144, 146 and 148 in preparation for each successive car 104 (or short string of cars 104) introduced on the entrance track 108. The construction and operation of the yard control system 150 is itself well known and not further described herein.

In a conventional manner, the yard control system 150 communicates with powered mechanisms that move the respective switches 132, 134, 136, 138, 140, 142, 144, 146 and 148 from one position, or alignment, to another. However, if any of the switches 132, 134, 136, 138, 140, 142, 144, 146 and 148 are instructed to change position prematurely, prior to the point where the currently switched car 104 is fully clear of the switching mechanism, a switch fouling condition can occur as the switch attempts to change position while the wheels of the switched car 104 are still within the switch assembly. Switch fouling not only delays the further switching of cars 104 until resolved, but it can damage the switch, the track, and the car's wheels. Worse, switch fouling can derail the car 104 being switched, bringing all switching activity in the classification yard 100 to a halt until the derailed car can be righted or returned to a proper track footing, and any consequential damage can be appropriately repaired or mitigated.

To avoid switch fouling, each switch 132, 134, 136, 138, 140, 142, 144, 146 and 148 demands a protected area or zone for switching operations of cars 104. Each protected area is defined by short distances upstream and downstream of each switch location where the presence of a car 104 is too close to the switch from which the adjoining tracks diverge. Referring to FIG. 1, if the switched car 104 is too close to the switch 138, at a point where the distance between the tracks 110 and 118 has not sufficiently widened, then the next car to move through the switch 138 to the adjacent track can clip the corner of the car 104. In contemplated embodiments, the entire protected area, or zone, for each switch may range between 50 feet and 200 feet in length.

To help prevent switch fouling in the yard 100 as cars 104 are switched, a number of techniques have been conventionally been used to sense and detect cars 104 that are in a protected switch area and may foul the switch if a change of position is attempted by the yard control system 150. For example, conventional inductive loop sensing systems have been used for such purposes, but inductive loops are relatively expensive and subject to damage and reliability issues due to their typical mounting to the tops of railroad ties along each track. The ladder arrangement of the tracks such as in the example shown in FIG. 1 also presents extreme length and geometric complexity for outfitting switch assemblies and track with inductive loops. Inductive loop sensors are accordingly not a practical or economical solution to the problems presented.

Wheel counters are sometimes also conventionally used to prevent switch fouling of cars in the yard 100. For instance, non-mechanical hall-effect sensors may be utilized to detect rotations of the wheels on a car 104 as it is being switched, and from the detected wheel rotations the location of the car 104 may be inferred by the switchyard control system 150. However, wheel counter solutions rely on a count-in/count-out technique for interpolating whether a car 104 still remains in the switch's protected area. If detections of wheel rotations are missed or aliased, the rotation count can be off and the counters, if not the entire yard control system 150, must be manually reset to restore proper operation.

In view of the shortcomings of inductive loops and wheel counters, conventional track circuits are most typically utilized to detect cars in a conventional manner within a switch's protected area. Track circuits are low power DC circuits established through the opposed rails of the track sections in the protected area of each switch. The track circuit is shorted when the metallic wheels of a car 104 are in contact with both rails (typically steel rails) in the section of track. With no car 104 present, the DC potential imposed on the two rails is sufficient to energize a mechanical relay or its electronic equivalent. When shunted by the conductive wheels of a car 104 passing over the rails in the track circuit, the majority of the current from the rail potential flows through the wheels leaving insufficient current to keep the relay energized. The de-energized relay closes normally-closed contacts, signaling the presence of the car 104 in that section of the track.

Track circuits, however, also suffer from several disadvantages. Insulators must be installed on the rails to define and separate sections of track that are deemed protected areas for the switches. Besides weakening the rail structures, track circuit insulators can be compromised by conductive contaminants (grease, dust, metal shavings, organic matter, and moisture) that establish low resistance paths across the ¼ inch to ½ inch insulator gaps that electrically isolate contiguous rails from one another. When the rails are partially shorted by these conductive contaminants or elements, the track circuits no longer operate and sensitivity settings must be readjusted to re-establish relay energize/de-energize thresholds.

During or after periods of heavy rain, water accumulation interacting with other contaminants beneath the rails can create a conductive path between the rails, thereby disabling the track circuit function altogether. To compensate, yard personnel must continually adjust the amplitude and sensitivity of the track circuit components to overcome the varying conductivity of this moisture-induced phenomena. This repeated, time-consuming process itself lowers productivity in the yard 100, sometimes causing yard personnel to resort to more manual methods of operation involving additional manpower to complete the switching of cars.

To summarize, in a flat yard 100 where cars 104 are pushed or shoved into various classification tracks 112, 114, 116, 118, 120, 122, 124, 126, 128 and 130 for assembling into consists 102, efficient and productive classification depends on effective car detection to prevent switch fouling or clipping of cars in close proximity on tracks diverging out of a switch. Current detection techniques utilizing track circuits suffer from performance loss due to moisture and contaminants that disrupt DC voltages applied to the tracks. Wheel counter and other techniques are not optimum due to non-deterministic methods that rely upon interpolation rather than absolute detection of car presence. Lower throughput and productivity as well as elevated labor costs are the typical consequence of a temporary loss of car presence detection, despite the cause or technology utilized.

Classification Yards, sometimes called "hump yards", are similar to flat yards such as the yard 100 in layout but use elevation and gravity as a means of moving cars 104 into particular consists 102 in a track ladder configuration. In hump yards, a yard engine 106 pushes cars 104 or short strings of cars 104 over a slight hill at the entrance track 108. When the car(s) 104 are released from the engine 106, the car(s) 104 accelerate as they travel downhill towards the array of switches and classification tracks. As such, the car(s) 104 generally enter the ladder at a higher speed than in a flat yard. To prevent excessive speeds of car(s) 104, one or more retarders are positioned on the entrance track 108 to slow the car 104 being classified to a desired speed to complete the car switching operation.

Retarders are generally pneumatically activated linear brakes that are activated through a series of pulsed applications by the yard control system 150. These retarders apply pressure to the wheels of a rolling car 104 to retard or slow the velocity of the car 104. The number and duration of pulsed applications of pressure by the retarders reduces and regulates the speed of the cars 104 moving through the switches to the desired classification track. The desired speed to be obtained via the retarders is typically calculated based on a variety of parameters including, but not limited to, car weight (including cargo), wheel condition based on information retrieved from a car database, distance to be traveled to connect to a consist being assembled on the proper classification track, and environmental conditions. Of course, in order to operate the retarders effectively, the speed or velocity of the car 104 must be detected and input to the yard control system 150.

Speed detection for dynamically operating the retarders is typically accomplished using techniques such as K-Band Doppler radar. The radar equipment to accomplish speed detection typically must be placed in relatively close proximity to the tracks to assess a speed of a moving car 104. Unfortunately, however, because of its proximity to the tracks, and also the relative close spacing of the tracks in the ladder, the radar equipment is vulnerable to damage in the normal course of yard operation, presenting maintenance and reliability issues that negatively impact productivity of the yard and increase the costs of operating the yard. Car presence detection for preventing switch fouling in this application is similar to Flat Yard applications and is provided by track circuits, wheel counters or exposed presence detection loops. Consequently, the same problems discussed above are introduced by these detection technologies—environmental susceptibility, high maintenance, and inaccuracies due to lack of redundancy and non-deterministic detection methods.

In most switch yards, whether flat or not, a long, relatively straight track is provided as a common exit track for a completed consist 102. The exit track is sometimes referred to as a Pull-Out track. The Pull-Out track may coincide with the entrance track 108 or be separately provided. When an engine 106 connects to the string of cars in the consist 102 and pulls it out of the yard 100 to the Pull-Out track, it is important that no other cars 104 residing on the adjacent classification tracks in close proximity to the switches that are connected to and feed that Pull-Out track are close enough to be "clipped" by the long string of cars being moved. Similar protection areas and detection zone challenges to those discussed above exist for the Pull-Out track, across even greater distances.

Figure 2:
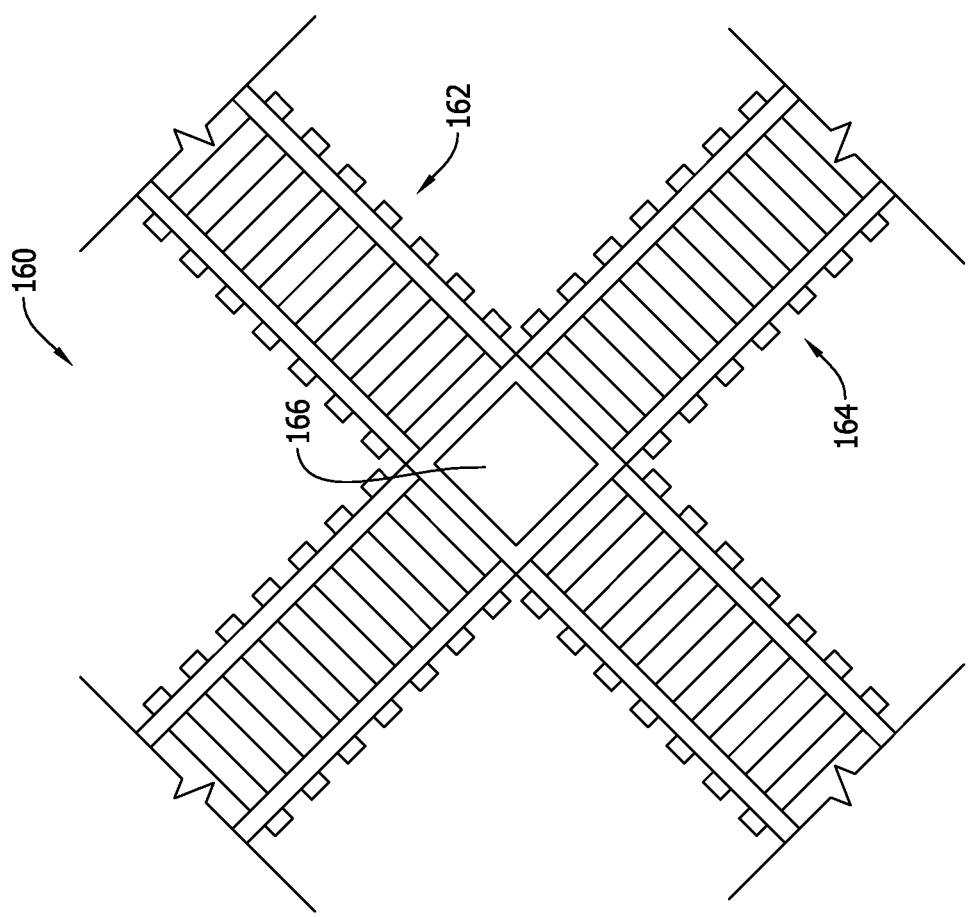
FIG. 2 illustrates an exemplary diamond crossing of railroad tracks that may benefit from the sensor system and methodology of the present invention.

Aside from classification yards discussed above, and as shown in FIG. 2, a diamond crossing 160 (sometimes referred to as a crossover) is shown where railroad train tracks cross or intersect one another. While in the example of FIG. 2, a first track 162 is shown to cross a second track 164 at an exemplary angle, resulting in a diamond shaped intersection 166 wherein the tracks 162, 164 converge and intersect. Considerable variations of crossovers are possible including different angles and hence elongated diamonds, as well as additional numbers of tracks, but nonetheless being conceptually similar to allow a train on one railroad track to cross at least one other railroad. Regardless, such crossovers may benefit from railroad car detection for similar reasons to those described above. A car similar to the car 104 (FIG. 1) or even an engine 106 (FIG. 1) on one track (e.g., the track 162) may be too close to the diamond 166 for a train on the other track (e.g. track 164) to safely pass without colliding with it. Inductive loops and radar have been used with varying degrees of success for car/engine presence detecting in such circumstances, but still suffer from the problems discussed above. Unlike the previous examples, diamond crossings cannot accommodate track circuit-based engine/car/train detection for such purposes. Due to train occupancy signal issues, "dead sections" may extend for 100 feet or more in each direction on every track converging on the diamond when a train is present at the diamond.

Switched crossing of tracks also present similar issues to those discussed above. For example, and assuming a different angle of approach than shown in FIG. 2, a train traveling on the track 162 may either continue on the track 162 and cross the track 164 or may be switched to the continue on the track 164 using a conventional railroad switch as described above. Ensuring the proper clearance for the train as it switched from one track to the other in a protected zone or area may be desirable. Those in the art will undoubtedly realize that complicated railroad crossing and switching arrangements exist that may present similar concerns to those discussed above.

A low maintenance system and method that can provide a deterministic and redundant train/engine/car presence detection that is universally applicable to a variety of different railroad settings and that is not affected by environmental conditions would be an improvement over currently used systems and methods such as those described above.

II. Presence Detection Systems and Methods of the Invention

Exemplary embodiments of a self-powered, tie-mounted sensor nodes and mesh network communicating to a local networked concentrator via ambient backscattering communications and wireless power transfer, as described below, provides an improved system and method of detecting trains on short sections of track that is applicable universally to the applications discussed above, without using track circuits and while avoiding the issues of inductive loops, radar systems and wheel counters. Reliable and relatively low cost deterministic and redundant car presence detection is realized that is not affected by environmental conditions. Advantageously, improved efficiency and productivity of railroad operations is also realized to meet longstanding and unfulfilled needs in the art for more effective and productive use of railroad resources.

Figure 3:
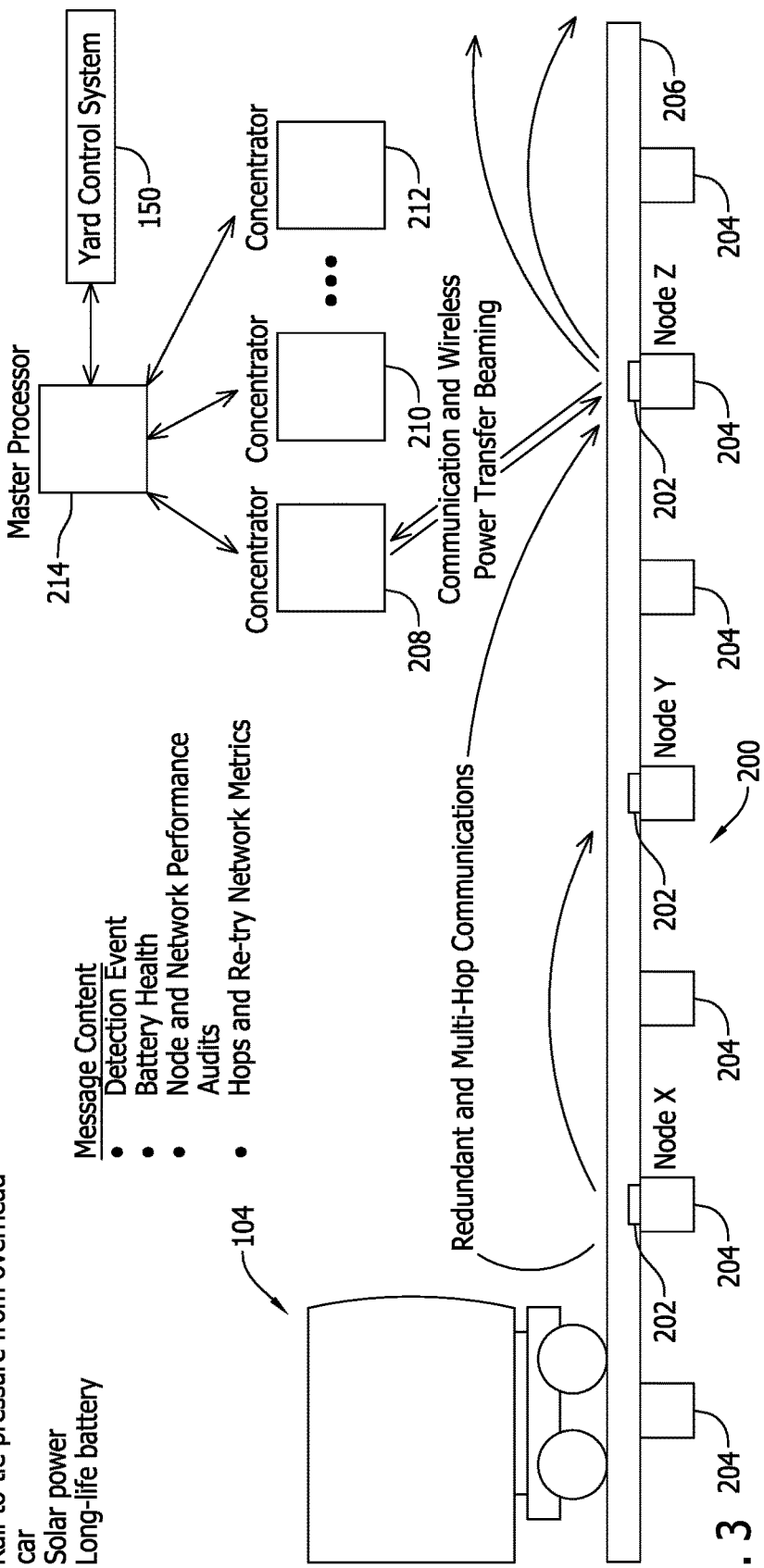
FIG. 3 illustrates a first exemplary sensor system for detecting train car location, speed and heading implementation in a first portion of the switchyard shown in FIG. 1 or in the crossing of FIG. 2.
Figure 4:
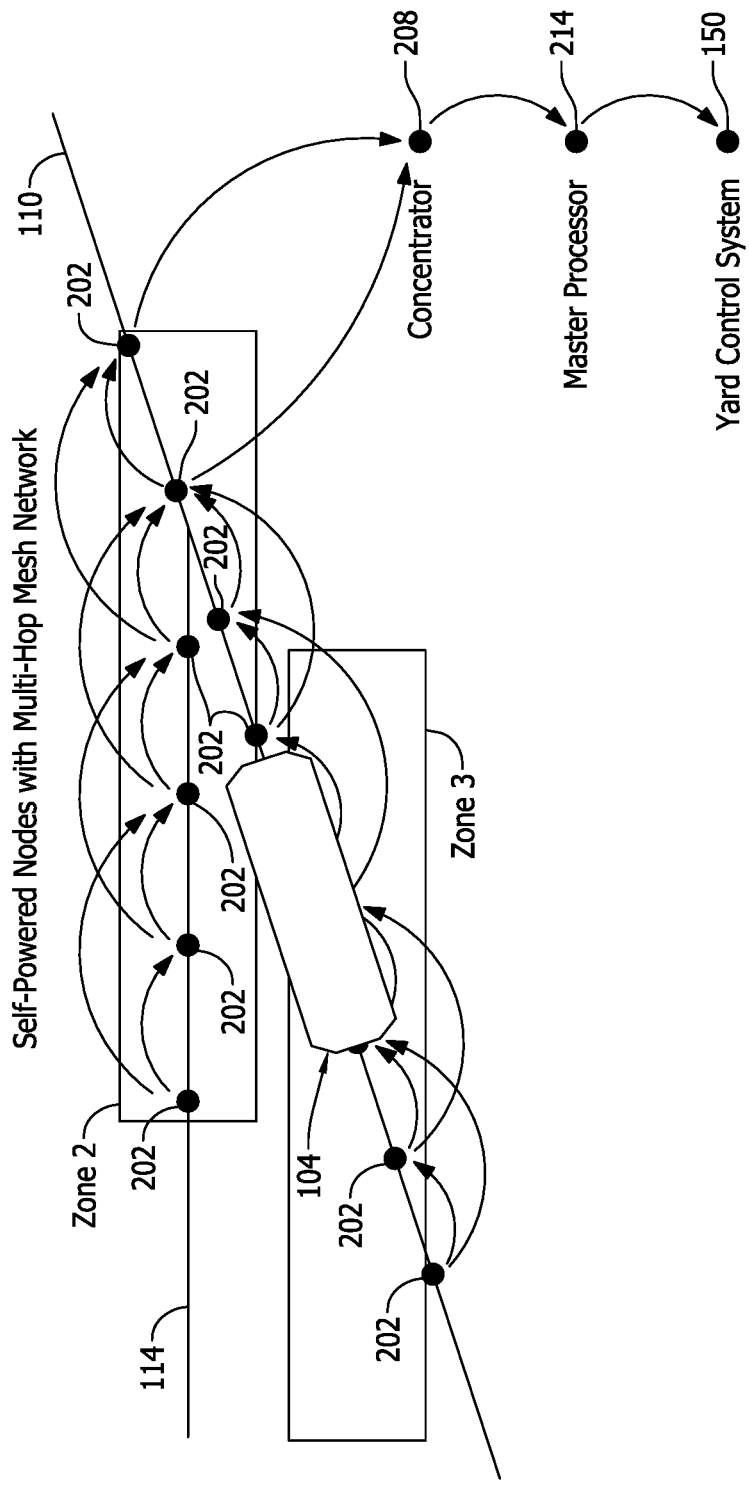
FIG. 4 illustrates a second exemplary sensor system for detecting train car location, speed and heading implemented in a second portion of the switchyard shown in FIG. 1 or in the crossing of FIG. 2.
Figure 5:
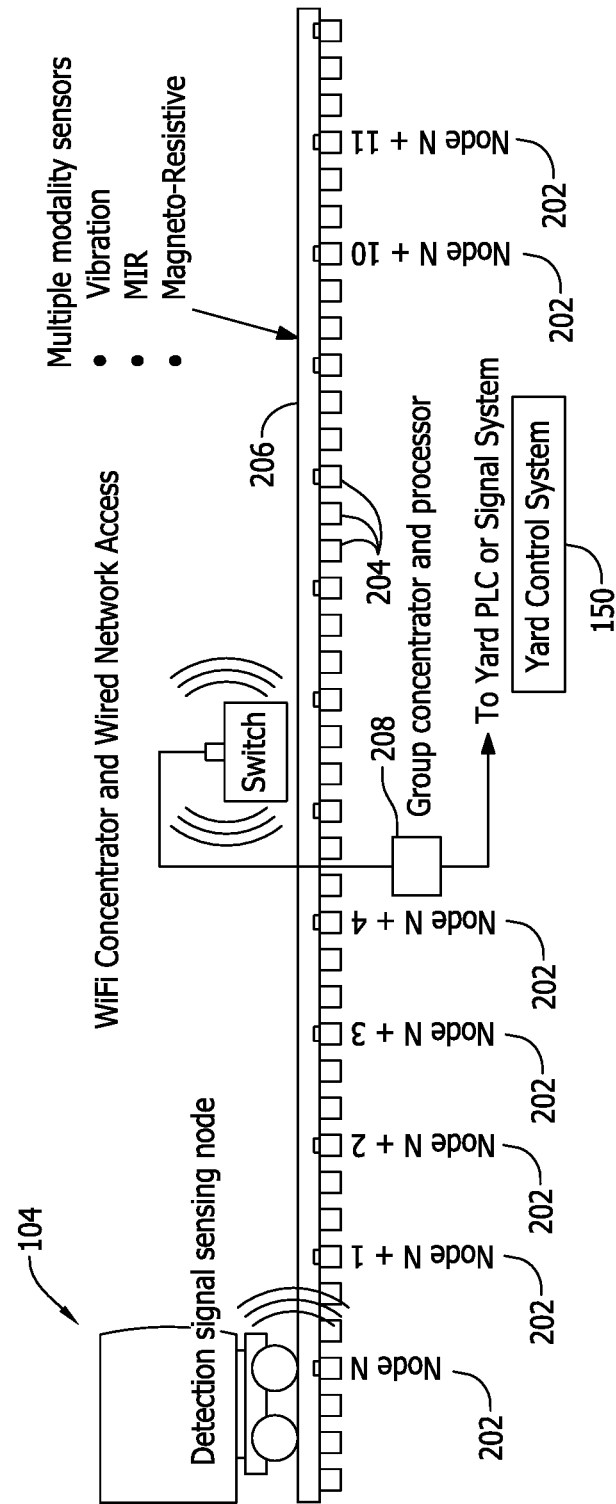
FIG. 5 illustrates a third exemplary sensor system for detecting train car location, speed and heading implemented in a second portion of the switchyard shown in FIG. 1 or in the crossing of FIG. 2.

As shown in the examples of FIGS. 3-5 a system 200 is envisioned including a contiguous series of self-powered, ultra-low power, or energy harvesting sensor node devices 202 that detect a presence of a car 104 (or engine 106) in a section of track and communicate such detection using "mesh" or "swarm" networking techniques, to relay presence information of a car 104 from a collection of railroad ties 204 supporting the opposed rails 206 in a track section. The track section may relate to presence detection in the flat yard 100 (FIG. 1), a classification yard similar to the flat yard 100 as discussed above, a Pull-Out track, a diamond crossover or switched track arrangement outside of a yard, an intersection of railroad tracks with a roadway for automotive use, or other railroad application. In the example shown in FIG. 3, the sensor node devices 202 are provided on every other railroad tie 204, while alternatively they could be placed on every second, third or fourth railroad tie 204 in other embodiments. A number n of sensor nodes 202 may be used on a number n of railroad ties to define a protection zone of a desired length and commensurate section of track in which train, railroad car, or engine presence may be sensed. Multiple protection zones may be defined having different groups of sensor nodes 202, such as in the yard application having a ladder configuration of tracks shown in FIG. 1.

The system 200 further includes periodically placed concentrator nodes 208, 210, 212 that receive and collect information from a group of sensor nodes 202, providing explicit and implicit detection information from which a Master Processor 214 can derive detection, speed, and heading information from all protected areas or zones within the yard 100. This information may then be used to inform the yard control system 150 of car locations and exact speeds in order to optimize yard traffic and classification productivity, without the negative consequences of conventional techniques as described above. A number n of concentrator nodes (typically less than the number n of sensor nodes in each zone) may communicate with the same sensor nodes in the same protection area or zone, or with multiple sensor nodes in different protection areas or zones. The number of sensor nodes and concentrator nodes is scalable to accommodate any desired number of protection zones.

Using near-field mesh networked wireless communication and synchronized time division multiplexing, the duty cycle associated with communicating car presence information by the system 200 is sufficiently low that a variety of self-powered or ultra-low powered techniques may be utilized for the sensor nodes 202 and/or the concentrator nodes 208, 210, 212. Because each sensor node 202 communicates information primarily only when a car 104 is detected, and does so in a manner whereby multiple nodes 202 receive and re-broadcast each information packet, a high level of redundancy is achieved that increases system reliability. As described below, aside from train/engine/car presence information, health information from each node may also be periodically communicated to ensure system reliability.

The system 200 will now be explained in further detail illustrating exemplary components and methods that advantageously overcome the problems and disadvantages of conventional engine/car detection systems and methodology.

Figure 6:
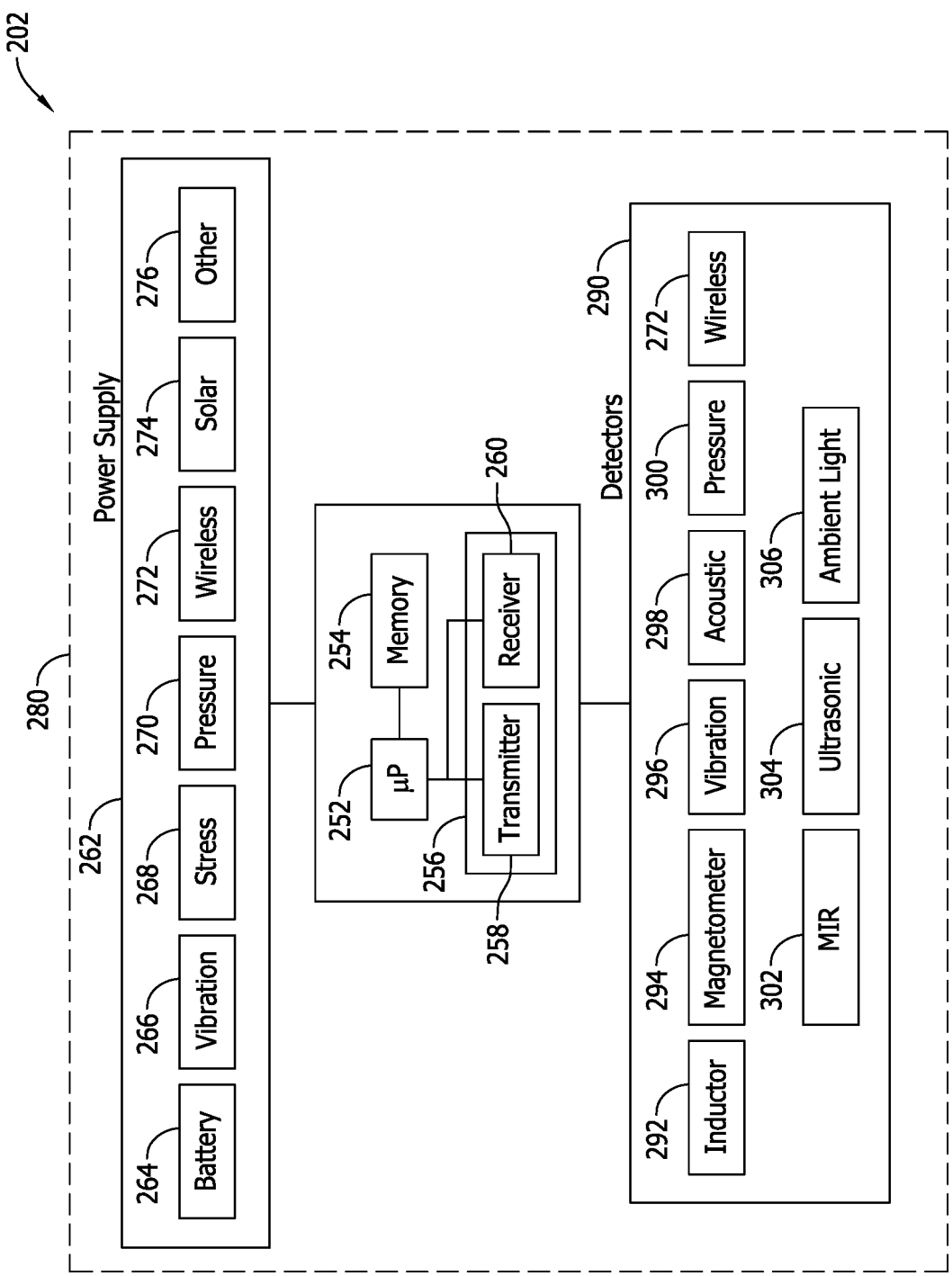
FIG. 6 is a block diagram of an exemplary sensor node for the systems illustrated in FIGS. 3-5.

FIG. 6 is a schematic diagram of an exemplary sensor node 202 for the system 200 that is configured to detect railroad engine/car presence and communicate data to a concentrator using wireless transmission techniques. The sensor node 202, in combination with other sensor nodes and concentrators, may be used to establish a multi-path, wireless data communications network for detecting and communicating railroad engine/car presence, speed and heading information to an external system for the applications described above. More specifically, and as explained below, the sensor node 202 is a radio device that, in combination with other similar devices, may be used to establish a multi-path, wireless data communications network using mesh or swarm networking techniques. It is recognized, however, that in an alternative embodiment a wired communication network may be utilized, albeit with greater expense and without realizing the full benefit of the system 200.

In the example shown, the sensor node 202 is a programmable processor-based device including a processor 252 and a memory storage 254 wherein executable instructions, commands, and control algorithms, as well as other data and information such as communication network and protocol parameters required to satisfactorily operate the sensor node 202 are stored. The memory 254 of the processor-based device may be, for example, a random access memory (RAM), and other forms of memory used in conjunction with RAM memory, including but not limited to flash memory (FLASH), programmable read only memory (PROM), and electronically erasable programmable read only memory (EEPROM).

As used herein, the term "processor-based device" shall refer to devices including a processor or microprocessor as shown for controlling the functionality of the device, but also other equivalent elements such as, microcontrollers, microcomputers, programmable logic controllers, reduced instruction set (RISC) circuits, application specific integrated circuits and other programmable circuits, logic circuits, equivalents thereof, and any other circuit or processor capable of executing the functions described below. The processor-based devices listed above are exemplary only, and are thus not intended to limit in any way the definition and/or meaning of the term "processor-based device."

The sensor node 202 also includes a radio transmission element 256 that may include a transmitter 258 and a receiver 260. The transmitter 258 and receiver 260 may be separately provided from one another, or alternatively may be combined into a single device referred to as a transceiver. The radio transmission element 256 sends and receives wireless data signals using known radio frequency transmission techniques. The data and information communicated with the radio transmission element 256 may be processed, formatted or converted into an appropriate communications protocol by the processor 252 utilizing information stored in the memory 254. For example, digital radio frequency signals may be transmitted and received using a specified protocol for the contents of the data messages sent by the node 202. Parameters for network communication may include data and information such as the size (i.e., the number of bits) of the data signals transmitted, the order of bits constituting the message, unique radio identifiers, hardware and software version codes, security codes, diagnostic codes and the like as those in the art will appreciate.

Additionally, desirable signal processing such as amplification, filtering, signal conversion (e.g., digital to analog conversion), and diagnostic procedures may be performed. Algorithms and instructions for executing specific communication protocols and procedures are stored in the memory 254, for example, and executed by the processor 252 to communicate information over a communication network including other sensor nodes 202 and concentrators 208, 210, 212. On this note, the concentrators 208, 210 and 212 in contemplated embodiments may be processor-based devices constructed similarly to the sensor node 202 but are provided to receive communicated messages from the sensor nodes 202 and forward them to the master processor 214 instead of detecting engine/car presence and generating messages relating to the detected presence as the sensor nodes 202 are designed to operate.

The radio device transmission element 256 in the sensor node 202 may be configured as a short range radio for communication over relatively short distances. When configured as a short range radio, the sensor node 252 may be adequately powered by an on-board power supply 262. Preferably, the on-board power supply 262 includes a plurality of different power sources operable individually and in combination by power management circuitry. In contemplated examples, the on-board power supply 262 includes including a battery power storage element 264, a vibration energy harvesting element 266, a stress energy harvesting element 268, a pressure harvesting element 270, a wireless power harvesting element 272, a solar assisted power element 274, and at least one other energy storage element 276. The various power sources 264, 266, 268, 270, 272, 274 and 276 facilitate a low-maintenance, self-configuring, and self-powering sensor node 202 that is able to operate without adjustment or service regardless of environmental conditions. Such a combination of different power sources, in combination with power optimization methods and techniques, provides years of operation without maintenance associated with more conventional power sources including a single power supply such as only the battery 264.

Generally, as a railroad car 104 is being detected, the detecting node 202 utilizing one or more of the power sources in the power supply 262, communicates that information multiple times to multiple neighboring nodes 202, which together use a mesh network routing algorithm to "push" accumulated detection event data towards a Concentrator 208, 210, 212 where it may delivered in real time to the Master Processor 214 where detections and mechanical disturbances from a multiplicity of points is processed to yield real-time presence and speed information.

The battery power supply 264 may be a commercially available, long life, sealed-source, but from which energy is delivered only when necessary. That is, limited use of the battery power supply 264 is desired as once the battery is depleted, a maintenance event is generally necessary to replace it for full operation of the sensor node 202. The battery power supply 264 may also be used to augment other energy harvesting and wireless power beaming in the other power sources described below, with battery power savings further reduced by the power optimization methods described below. As one example, the battery power supply 264 may be a lithium-based battery that can supply node power for as long as 20 years without requiring replacement when used as contemplated herein. One of the primary features associated with system 200 is to reduce, if not eliminate, a dependency on battery power sources that present maintenance issues such as replacement or individual adjustment or cleaning for optimal use. In some cases then, the battery power supply 264 may be considered optional and need not be included. The battery power supply 264 may in some embodiments be a rechargeable battery.

The vibration energy harvesting element 266 provides a redundant power source that may be alternatively used in lieu of or in addition to the battery power source 264. In a yard application, cars 104 may travel at relatively low speeds, ranging from near zero to 10 MPH in contemplated embodiments. The weight of the cars 104, even empty ones, is significant enough that there is considerable vibration imparted to the rail 206 and tie railroad tie 204 structures as a car 104 passes overhead. These ambient vibrations can be a source of energy that is harvested by the vibration energy source element 266 to one or more sensor nodes 202 during car travel that is used to augment or possibly replace the internal battery source 264. When used in combination with the battery 264, the vibration energy source element 266 facilitates an extended battery life and minimizes battery replacement events (an undesirable maintenance event).

The stress energy harvesting element 268 provides another redundant power source that may be alternatively used in lieu of or in addition to the battery power source 264. When cars 104, empty or loaded, pass over a wooden tie 204, the tie 204 flexes under the weight of the cars 104. The flexing or bending action of the tie 204 may derive voltage from a piezo-electric generator element and stored in the stress energy source element 268, augmenting primary battery life of the battery 264 or perhaps allowing the battery to be eliminated altogether. The piezo-electric element is also utilized as one of a multiplicity of redundant detection methods as described below.

The pressure energy harvesting element 268 provides another redundant power source that may be alternatively used in lieu of or in addition to the battery power source 264. When cars 104, empty or loaded, pass over a tie 204, the rail 206 is pressed downward under the weight of the cars 104. This extreme pressure may be converted to an energy spike using a piezo-electric generator element and stored in the pressure energy harvesting element 268. The piezo-electric element is also utilized as one of a multiplicity of redundant detection methods as described below.

An additional method of subsidizing and prolonging internal battery energy of the nodes 202 is through a process referred to herein as "Wireless power transfer (WPT) or wireless energy transmission" that is represented by the wireless energy harvesting source 272. Using Wi-Fi or microwave region energy, power can be radiated and directed to an antenna and tuned charge pump circuit from ambient broadcast signals or local data radio system that can also participate in information transfer from the sensor nodes 202 associated with a particular track segment to a concentrator 208, 210, 212.

The solar energy harvesting element 274 provides another redundant power source that may be alternatively used in lieu of or in addition to the battery power source 264. Low profile packaging of the sensor node 202 is envisioned whereby the sensor node 202 can be exposed to solar energy through a hardened, self-cleaning window to augment the internal battery power source 264.

The at least one other energy storage element 276 represents energy storage elements that may be derived from the other power sources shown in use. For example, a capacitor or supercapacitor in a circuit may be charged from one of the other power sources described, and the energy stored may be returned to the circuit when other ones of the power sources are switched off, disconnected, or depleted. Power management circuitry may monitor a voltage of each power source represented in the power supply 262 and selectively utilize them in a prioritized manner to utilize the battery power supply 264 only as a last resort when the other power sources are unable to supply sufficient energy to operate the sensor node 202. As contemplated, and in view of the number of other power sources represented in the sensor node, the battery power supply 264 can be expected to be infrequently used, such that when the batter power supply 264 is itself a long-life element, the sensor node 202 may operate for a period measured in decades before the sensor node 202 requires maintenance. The plurality of different power sources provides a redundancy and fail-safe operation of the sensor node 202 wherein the sensor node 202 will reliably operate even if one of the power sources fails or ceases to operate normally or properly.

While the multitude of different power sources in the supply 262 are beneficial for the reasons stated, it is understood that in some installations the sensor nodes 202 could also be supplied power from an external power supply such as a line power supply powering other railroad systems and equipment or a higher capacity battery power supply associated with an external system or piece of equipment. Such line power or higher power battery source may be provided in addition to or in lieu of the other power sources described above. If a higher energy or higher capacity power supply is made available, one or more of the sensor node(s) 202 may be configured to provide long range radio communication to a remote location as desired. Alternatively, the system 200 could be wired in whole or in part instead of being wireless, although wiring of the system 200 may decrease its flexibility and increase installation costs. It is also noted that in some embodiments, a single power source may be provided instead of a combination of power sources as shown and described, although depending on which type of power source is selected for use, installation costs and/or maintenance issues may result.

In addition to the plurality of power sources described above, power optimization schemes and techniques are employed in wireless operation of the sensor node 202 to further reduce power consumption in operation. For example, time division multiple access (TDMA) communication is contemplated, which is synchronized for ultra-low duty cycle to reduce power consumption of the sensor node 202 in operation.

More specifically, individual tie-mounted sensor nodes 202 may communicate with one another or with a Concentrator 208, 210, 212 utilizing a Time Synchronized Mesh Protocol (TSMP). This mesh networking protocol, based on the IEEE 2.4 GHz 802.15.4 2006 radio standard, includes a Time Slotted Channel Hopping (TSCH) media access layer (MAC). TSCH works by dividing time into 'slots', and providing a mechanism to map timeslots to channels with a pre-assigned hopping sequence.

After joining the network, each sensor node 202 may enter and spend the majority of its time in an ultra-low power sleep mode, communicating in a synchronous manner with the Concentrator 208, 210, 211 and only consuming a few microseconds of power doing so. This very low communication duty cycle minimizes energy consumption from the internal battery 264 of each sensor node 202 as well as the other energy storage elements represented in FIG. 6 and described above.

As an alternative to TSMP, or in combination with TSMP, ambient backscatter techniques may be used as an ultra-low power communication method in the system 200. Using carrier signals from a proximate wireless network, Wi-Fi access point Concentrators for example, individual sensor nodes 202 can broadcast information to a Concentrator by harvesting power from the 2.5 GHz or 5 GHz Wi-Fi transmission and utilizing an ultra-low power sensor and processor circuit to switch an antenna between reflecting and non-reflecting states. This permits the device to "broadcast" information related to train presence and health to adjacent nodes or the Concentrator by backscattering the ambient RF energy.

In a switching yard application, there are periods when no switching activity is underway—periods that can last for hours. Through mechanisms that sense vibration imparted onto the rails 206 by moving cars 104, individual sensor nodes 202 are able to sense when switching activity is about to begin from hundreds of feet away. During these quiescent periods, the sensor nodes 202 have the ability to enter a sleep mode from which they can be awakened once switching activity is about to begin, providing a considerable internal battery power savings.

If a switching yard "ladder" is due to be out of service for a period of time due to railroad schedules or to maintenance activities, a sleep mode instruction can be communicated to the sensor nodes 202 to further conserve internal battery power.

The sensor node 202 including all the elements described thus far and also further below, may be packaged in a rugged, low-profile housing 280 such that the sensor nodes 202 can be mounted on top of a railroad tie 204 supporting the rails 206 in a yard 100 or elsewhere. The housing 280 may be provided in a compact modular, hockey puck-size and shape that can be easily carried by hand on site as the sensor nodes 202 are being installed. The low profile packaging allows the nodes 202 to be installed on railroad ties 204 in an unobtrusive manner that reduces a likelihood of impact or damage during ordinary use of the switch yard or by other railroad operations. The housing 280 may include mounting features to facilitate installation to a railroad tie 204. The housing 280 may, for example, be an injection molded housing fabricated from a heavy duty plastic material. Waterproofing and hermetic sealing features may be provided to obtain a weatherproof sensor node 202 that is generally impervious to weather conditions and is reliably operable in all seasons.

By communicating engine/car detection events from individual sensor nodes 202 to Concentrators 208, 210, 212 and to the Master Processor 214, individual car location can be confirmed and tracked throughout the yard 100. This information is then used to inform the yard control system 150 to prevent switch fouling as well as providing speed indication for precise retarder control when needed. Because the tie-mounted sensor nodes 202 are mounted at fixed distances from one another, the speed can easily be calculated by tracking the time difference between successive detections of contiguous nodes, and dividing the fixed difference by the time between the successive detection. Heading information is likewise determined by the order in which contiguous node detections are made. As such, while multiple sensor nodes 202 are preferred to determine heading and speed information, when presence detection is only desired the system 202 may be implemented with as few as one sensor node 202.

Multiple, redundant component and methods of sensing or detecting car presence are contemplated in each sensor node 202 that are generally represented as detectors 290 in FIG. 6. This permits verification of detection events as well as provides various different ways of sensing cars of differing geometries, weights, and materials. It is envisioned that the magnitude of each different detection method parameter be included in each triggered communication from a sensor node 202 regarding a sensed car 104. The processor 252 of the sensor node 202, the processor of a concentrator receiving the data message, or a processor of the master element 214 may compare the detection (or not) by the different types of detectors to confirm a car presence, determine an error condition, or assess the health of the sensor node 202.

Recognizing that many railroad cars contain sufficient metallic content, the detectors 290 in the sensor node 202 may include an inductor 292 or magnetometer 294 to sense and detect a railroad car passing overhead the sensor node 202.

Substantial mechanical vibration may not only be used for energy harvesting as described above, but also may be sensed with a vibration sensor 296 to detect railroad cars 104 passing over individual sensor nodes 202. The vibration sensor 296 may be part of the vibration power harvesting element 266 described above or may be separately provided.

Another form of vibration, namely the acoustical energy produced by a proximate railroad car 104, generally contains frequencies in known regions, which may be recognized based on input from an acoustic sensor 298. The acoustic signature may also be used as a redundant affirmation of car presence close to a sensor node 202 that may be compared with the outputs from the other detection elements described.

The substantial bilateral pressure exerted by a car's wheels on the junction of the rail 206 and the tie 204 that is used for energy harvesting may also be used to sense cars passing over individual nodes with a pressure sensor 300. The pressure sensor 300 may be part of the pressure harvesting element 270 described above or may be separately provided.

When the wireless Concentrator Power Beaming Signal is utilized as represented by the power source 272, any attenuation or loss of communications between the node and the Concentrator, attributable to a car 104 passing over a node sensor node 202, can be used to infer car presence due to the interference caused by the metallic content of the car.

As represented by the MIR element 302, a highly precise form of close-range microwave region radar called "impulse radar" can also be used to detect a car 104 passing over a sensor node 202. Micro power Impulse Radar (MIR), as it is known, is a low-cost, low-power method of sensing objects up to 4-5 meters away. It is anticipated that an upward-facing impulse radar capability be utilized to detect or verify car presence once one of the other detection subsystems has provided an initial indication of possible presence.

Similar to MIR, an upward facing ultrasonic component 304 may also provide a redundant or alternative manner of car detection to initially detect or verify a car presence determined one of the other detectors.

The solar energy harvesting subsystem 274 can also detect when ambient light has been masked by the presence of an overhead car. This visible light detection method is to be used in conjunction with other forms to detect or to validate detection of a car. The ambient light detector 306 can be part of the solar system 274 or may be separately provided as desired.

The multiple and different types of detection provide redundant and deterministic train/engine/car detection signals that may be compared to assess operation of the system 200, confirm detection events and identify error conditions and false detections. It is understood, however, that in certain embodiments each sensor node 202 could include a single type of detector to provide a lower cost system if desired. Additionally, different sensor nodes 202 including different detector elements could be provided and used in combination if desired. For example, a sensor node 202 on one tie 204 may detect engine or car presence using ambient light detection only, while a sensor node 202 on another tie may detect engine or car presence using only acoustic sensing. Accordingly, systems of varying cost and complexity may be provided that use different types of detections at different ties in each sensor node, rather than use all the different types of detectors at each node.

In contemplated embodiments, each sensor node 202 also communicates a detected car presence and/or health information in a peer-to-peer manner to another node 202 until a Concentrator 208, 210, 212 receives the message and is able to pass activity data from each node in a zone to the Master Processor 214. The health information may include real time information regarding energy storage in the power sources, energy used by the various power sources, transmission data and information regarding the number of transmission made and received, error information, etc. As previously mentioned, ultra-low power wireless mesh networking utilizing Time Synchronized Mesh Protocol (TSMP) may be used to minimize energy used by each node 202 in order to minimize power consumption from the power supply 262 including the various power sources, essentially making the system 200 maintenance-free.

When communicating detection and/or health information, each sensor node's broadcast in its particular transmit time slot is received by several other sensor nodes 202 located nearby. Part of the mesh networking protocol, this network redundancy assures high communication reliability as well as permitting the system 200 to operate with the loss of one or more nodes. Such Multi-Hop mesh peer-to-peer messaging can realize self-organizing, and self-healing network operation with redundant signal paths to ensure communication of messages. Protection zones can be easily expanded by adding nodes, reduced by subtracting nodes, or enhanced by adding or replacing sensor nodes at desired locations in the protected area based on real time analysis of the network in operation. The analysis may be facilitated by the health information reported over the network and/or from archived reporting in a system database that facilitates analysis and troubleshooting of the system performance after installation.

In order to conserve energy used for communications, it is anticipated that radio frequency transmissions that are intended to be peer-to-peer between sensor nodes 202 that are located between rails 206 be directed in that manner. By minimizing RF energy directed where no nodes 202 are located, further power savings are anticipated.

As mentioned previously, sensor node operation that conserves and prolongs battery life is paramount. Highly power efficient communication is therefore utilized and battery life is subsidized by multiple other energy sources capable of harvesting power from the environment and from car movement on the rails 206. As yet another reliability measure, health information packets that are periodically generated and communicated from the sensor nodes 202 provide a quantitative measure of remaining battery energy, permitting any future battery or node replacement to be known well in advance.

Because battery power is subsidized by energy derived from numerous other sources as described, how efficiently the overall energy budget is being managed by the sensor nodes 202 is also important to consider. To assess and evaluate these issues, the energy contributed by each of these auxiliary power supplies and associated subsystems is provided in the periodic health reports to facilitate any necessary physical optimization adjustments of the sensor nodes 202. For example, sub-optimal health reports in these aspects could indicate an improper or inadvisable mounting of a sensor node that if corrected may improve the results.

Optionally, health information may be made available in each transmission from a sensor node 202 that indicates how efficiently the data has been passed from node-to-node within the mesh networking protocol. Hop-count and other network metrics allow mesh routing parameters to be adjusted and optimized for improved results. Also available through such metrics is an indication regarding any lost or unresponsive nodes.

As noted previously, sensor nodes 202 are intended to be mounted to the tie structures 204 and also are intended to operate unattended for years with little or no maintenance. It is typical however, that sensor nodes 202 or the system 200 generally may require program upgrades to add features or to improve performance over time. To facilitate reprogramming of the sensor nodes 202 the Concentrator(s) may be used to wirelessly communicate settings and firmware updates to a collection of sensor nodes 202 using the ultra-low power information transfer techniques described in the foregoing. As such, the sensor nodes 202 may be conveniently updated with over-the-air programming updates when desired.

Alternatively, a proximity form of updating firmware may be used through the same inductive subsystem that assists in car detection in certain embodiments. For example, a portable wand device held in close proximity to a sensor node 202 can both power the device as well as transfer large amounts of information (for example, firmware updates) without requiring that the sensor node 202 be opened or removed from its mounting location.

While exemplary applications are described above for the system 200 including the sensor nodes 202, the self-powered, energy harvesting, battery-less dependent train detection system also has railroad applications outside of those mentioned above. For instance, detection heading and speed of trains on main line corridors can be used as a track circuit alternative for activating crossing warning systems and for advanced preemption of highway traffic signals adjacent to crossings. Such a system may also be used for detecting trains on crossing islands as an alternative to shunt systems, and for detecting the end of trains (used in conjunction with Positive Train Control (PTC) or wireless crossing activation).

The systems described herein may also provide input to Intelligent Transportation System (ITS) equipment for use apart from railroad entity operators. For example, train detection, speed, and head information could be output from the system 200 to facilitate (ITS) warnings, navigation decisions, and route selection decisions using global positioning guidance devices and the like to enhance driver safety and convenience for operators of automotive vehicles travelling on roadways impacted by the train.

The system 200 may be installed at relatively low cost with minimal disturbance to railroad operations. Sections of tracks and protection zones may easily be defined and the system 200 may be installed in a retrofit manner to existing railroad tracks either as a stand-alone system or as a complementary system to other conventional train detection systems and equipment.

Having now described the devices and functionality of the sensor system, as well as the systems contemplated for use in combination with the sensor system, it is believed that programming or otherwise configuring the processor-based devices described to effect the purposes and benefits is disclosed is within the purview of those in the art without further explanation. The method aspects and processes described may be implemented in flow charts and algorithms that are further believed to be within the skill in the art in view of the detailed description above.

The benefits and advantages of the system 200 are now believed to been amply demonstrated in relation to the exemplary embodiments disclosed.

A system for detecting location, speed and heading information of a moving object in a predefined protected area has been disclosed. The system includes a plurality of processor-based sensor node devices arranged in spaced relation to one another to establish the predefined protected area. Each of the plurality of processor-based sensor node devices includes at least one detection element configured to sense at least one of the location, speed and heading of the moving object within the predefined protected area. At least one concentrator node device is in communication with each of the plurality of processor-based sensor node devices when the moving object is within the predefined protected area.

Optionally, each of the plurality of processor-based sensor node devices includes a radio transmitter establishing wireless communication with the at least one concentrator node device. Each of the plurality of processor-based sensor node devices may also include a plurality of different detection elements configured to sense an aspect of the location, speed and heading of the moving object. The plurality of different detection elements may be selected from the group of: an inductor element, a magnetometer, a vibration sensor, an acoustic sensor, a pressure sensor, a wireless power element, a micro power impulse radar element, and ultrasonic detection element, and an ambient light sensor element.

Each of the plurality of processor-based sensor node devices may include an onboard power supply, the onboard power supply including a plurality of independently operable power supplies of different types. The plurality of independently operable power supplies of different types may be selected from the group of: a battery power supply, a vibration energy harvesting element, a stress energy harvesting element, a pressure harvesting element, a wireless power harvesting element, and a solar assisted power element. Each of the plurality of processor-based sensor node devices may be configured to enter a lower power sleep mode when a moving object is not present in the predefined protected area.

The predefined protected area for the system may be at least one section of a railroad track, and the plurality of processor-based sensor node devices may be mountable to at least some of the railroad ties in the section of railroad track. The detected object in the system may be one of a railroad car, a string of railroad cars, or a locomotive engine. The predefined protected area may be one of a portion of a classification yard, a portion of a pull-out track, a diamond crossover, a portion of a switched track arrangement, or an intersection of a railroad track and a roadway.

The plurality of processor-based sensor node devices may be configured to communicate with one another using near-field mesh network wireless communication with synchronized time division multiplexing. The plurality of processor-based sensor node devices may be configured to broadcast health information. The at least one concentrator node device may be configured to provide wireless power transfer to the plurality of processor-based sensor node devices. The plurality of processor-based sensor node devices may be configured to detect at least one of a size and weight of the moving object.

The system may additionally include a master processor device in communication with the at least one concentrator node device, and a railroad yard control system in communication with the at least one concentrator node device. A first plurality of processor-based sensor node devices is arranged in spaced relation to one another to establish a first predefined protected area, and a second plurality of processor-based sensor node devices is arranged in spaced relation to one another to establish a second predefined protected area. The first predefined protected area may corresponds to an intersection of a connector track and a first classification track in a railroad switchyard, and the second predefined protected area may correspond to an intersection of the connector track and a second classification track in the railroad switchyard.

Each of the plurality of processor-based sensor node devices may include redundant power supply elements including at least one battery, and power management circuitry prioritizing power management of the redundant power supply elements to limit the use of battery power and conserve battery power as long as possible. Each of the plurality of processor-based sensor node devices are configured to periodically communicate a quantitative measure of remaining battery energy.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system for detecting location, speed and heading information of a moving railroad car or string of railroad cars in a railroad switchyard, the system comprising:
   a first plurality of processor-based sensor node devices arranged in spaced relation to one another to establish a first predefined protected area corresponding to an intersection of a connector track and a first classification track in a railroad switchyard;
   a second plurality of processor-based sensor node devices arranged in spaced relation to one another to establish a second predefined protected area corresponding to an intersection of the connector track and a second classification track in the railroad switchyard;
   each of the plurality of processor-based sensor node devices including at least one detection element configured to sense at least one of the location, speed and heading of the railroad car or string of railroad cars moving within the first or second predefined protected areas;
   at least one concentrator node device in communication with each of the plurality of processor-based sensor node devices when the moving object is within the predefined protected area; and
   a master processor device in communication with the at least one concentrator node device and a railroad yard control system.

2. The system of claim 1, wherein each of the plurality of processor-based sensor node devices includes a radio transmitter establishing wireless communication with the at least one concentrator node device.

3. The system of claim 1, wherein each of the plurality of processor-based sensor node devices includes a plurality of different detection elements configured to sense an aspect of the location, speed and heading of the moving object.

4. The system of claim 3, wherein the plurality of different detection elements are selected from the group of: an inductor element, a magnetometer, a vibration sensor, an acoustic sensor, a pressure sensor, a wireless power element, a micro power impulse radar element, and ultrasonic detection element, and an ambient light sensor element.

5. The system of claim 1, wherein each of the plurality of processor-based sensor node devices includes an onboard power supply, the onboard power supply including a plurality of independently operable power supplies of different types.

6. The system of claim 5, wherein the plurality of independently operable power supplies of different types are selected from the group of: a battery power supply, a vibration energy harvesting element, a stress energy harvesting element, a pressure harvesting element, a wireless power harvesting element, and a solar assisted power element.

7. The system of claim 5, wherein each of the plurality of processor-based sensor node devices is configured to enter a lower power sleep mode when a moving object is not present in the predefined protected area.

8. The system of claim 1, wherein the plurality of processor-based sensor node devices are mountable to railroad ties of the connector track, the first classification track, or the second classification track.

9. The system of claim 1, wherein the detected object is a railroad car or a string of railroad cars decoupled from a locomotive engine.

10. The system of claim 1, wherein the plurality of processor-based sensor node devices are each configured to communicate with one another using near-field mesh network wireless communication with synchronized time division multiplexing.

11. The system of claim 1, wherein the plurality of processor-based sensor node devices are configured to broadcast health information.

12. The system of claim 1, wherein the at least one concentrator node device is configured to provide wireless power transfer to the plurality of processor-based sensor node devices.

13. The system of claim 1, wherein the plurality of processor-based sensor node devices are configured to detect at least one of a size and weight of the moving object.

14. The system of claim 1, wherein each of the plurality of processor-based sensor node devices includes redundant power supply elements including at least one battery, and power management circuitry prioritizing power management of the redundant power supply elements to limit the use of battery power and conserve battery power as long as possible.

15. The system of claim 14, wherein each of the plurality of processor-based sensor node devices are configured to periodically communicate a quantitative measure of remaining battery energy.

* * * * *